United States Patent [19]

Landry

[11] 3,949,190

[45] Apr. 6, 1976

[54] HEATED TUBE FOR DROP-IN DISPENSER

[75] Inventor: Thomas J. Landry, Old Saybrook, Conn.

[73] Assignee: AMF Incorporated, White Plains, N.Y.

[22] Filed: Aug. 28, 1974

[21] Appl. No.: 501,335

[52] U.S. Cl. ............... 219/385; 211/49 D; 219/214; 219/406
[51] Int. Cl.² .......................................... F27D 11/00
[58] Field of Search .......... 221/150, 279; 211/49 D; 312/71, 236; 219/214, 311, 385, 406, 535, 536

[56] References Cited
UNITED STATES PATENTS

| | | |
|---|---|---|
| 3,177,344 | 4/1965 | Morey ............................. 219/535 X |
| 3,351,741 | 11/1967 | Shelley ............................ 219/535 X |
| 3,436,525 | 4/1969 | Stanford .................... 221/150 HC X |
| 3,493,725 | 2/1970 | MacKay ............................... 219/385 |
| 3,738,722 | 6/1973 | Kooiman .............................. 312/71 |

Primary Examiner—Robert B. Reeves
Attorney, Agent, or Firm—George W. Price; Walter Lewis

[57] ABSTRACT

The wiring and controls for the heated tube are housed in a lengthwise extending channel, and this channel fits into one of the upright U-shaped structural members of the drop-in dispenser.

1 Claim, 5 Drawing Figures

HEATED TUBE FOR DROP-IN DISPENSER

This invention relates to self-leveling dispensers, and more particularly, to a heated tube for converting the dispenser into a heated one merely by dropping the dispenser into the heated tube.

In the preferred form of the invention, the heated tube has been particularly adapted to cooperate with the dispenser shown and described in co-pending patent application Ser. No. 359,075 by Frank C. Olsson filed May 10, 1973 now U.S. Pat. No. 3,863,576 for Adjustable Self-Leveling Dispenser. Therefore, the invention will be described in connection with that type of non-heated dispenser.

Figure 1:
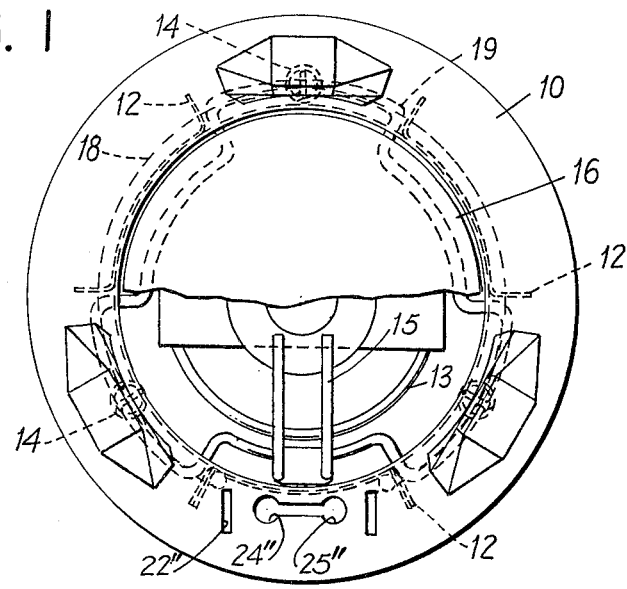
Figure 5:
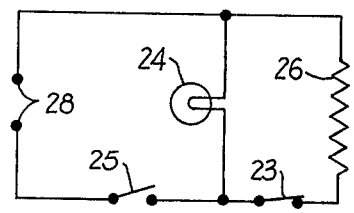
Figure 2:
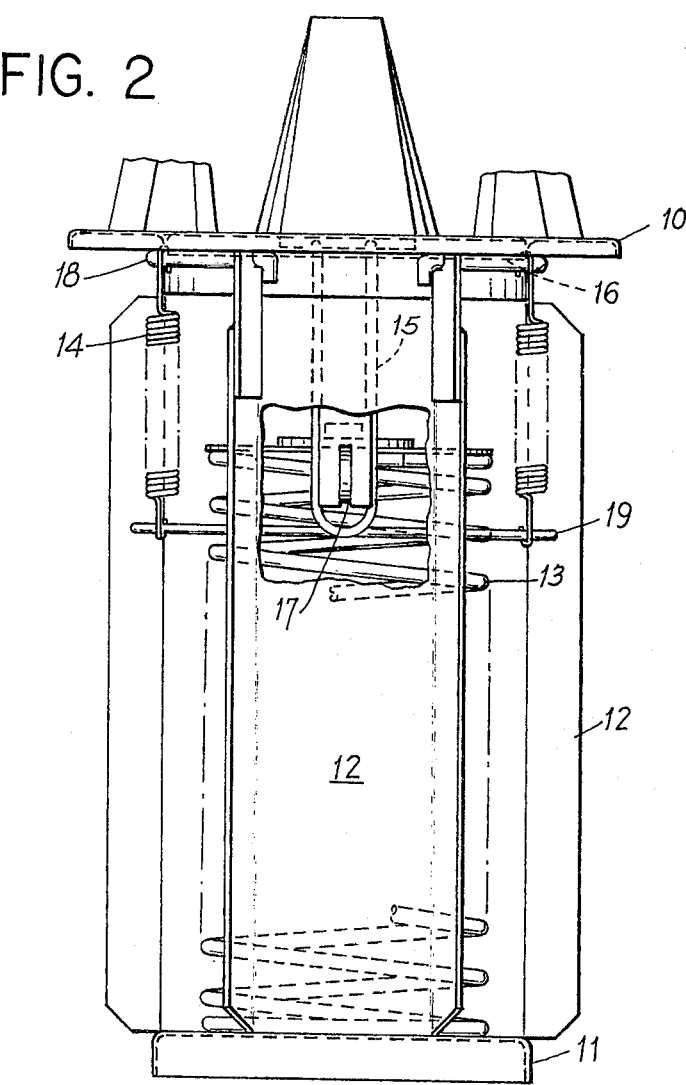
Figure 3:
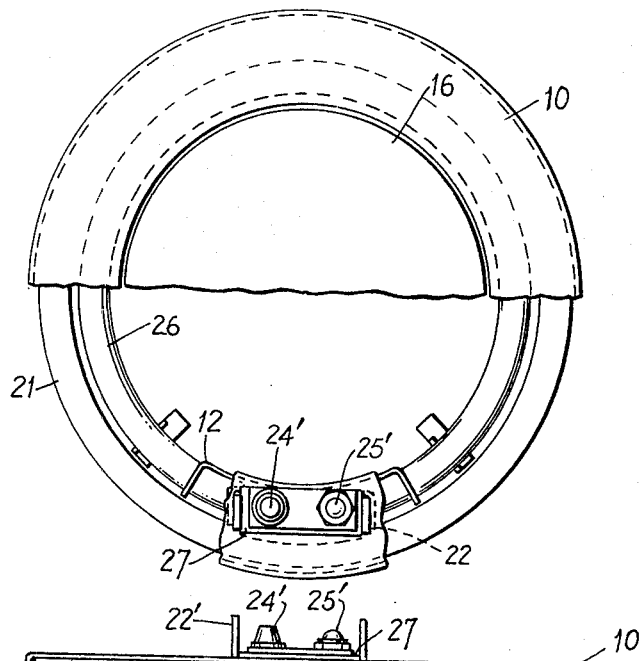
Figure 4:
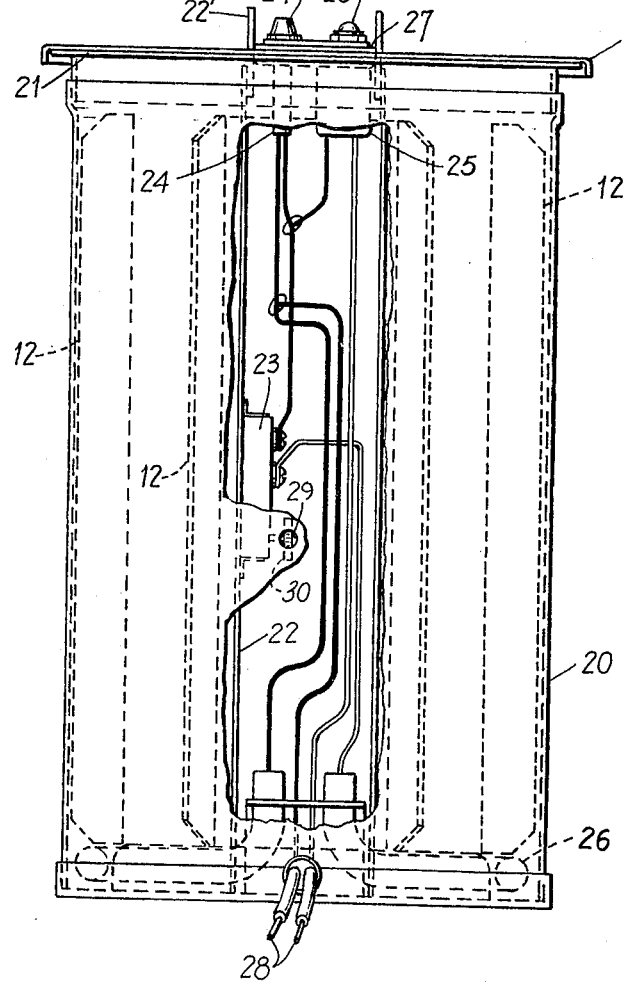

In the drawings, FIGS. 1 and 2 are broken away top and elevation views respectively of the type of dispenser shown in the referred to Olsson Ser. No. 359,075 patent application; FIGS. 3 and 4 are broken away top and elevation views respectively of the heated tube of the instant invention; and FIG. 5 is a diagrammatic illustration of the electric circuit in the heated tube.

Referring now first to FIGS. 1 and 2, the dispenser thereof which is described in greater detail in said Olsson Ser. No. 359,075 briefly comprises an annular top member 10, a circular bottom support 11, and a plurality of spaced lengthwise extending and outwardly facing U-shaped supports 12 interconnecting the two. This basic frame comprising parts 10, 11, 12 houses a main central compression spring 13 and a plurality of smaller surrounding tension springs 14. The spring 13 is positioned inside the members 12, whereas the springs 14 are distributed along the outside of members 12. Also positioned inside the members 12 is a floating wire cage 15 and an overlying cover plate or table 16. The springs 13 and 14 bias the cage 15 and its table 16 upwardly. In moving up and down the cage 15 is guided by rollers 17 mounted thereon which roll along the inner surfaces of the members 12 so as to prevent the cage 15 and its table 16 from cocking or tilting. The springs 14 are hooked at their upper ends on a wire 18 on the upper end of the frame, and at their lower ends are adapted to be selectively hooked on to a wire 19 at the bottom of the cage 15. When the springs 14 are not hooked on to the wire 19, they are moved along the wire 18 into out of the way stored position within the members 12. All this is described in still greater detail in said Olsson Ser. No. 359,075 so will not be repeated herein; however, suffice to say that the head load is adjusted at the main spring 13 and the load rate of travel is adjusted at the springs 14. This type of unheated adjustable self-leveling dispenser can be dropped in to the hole of a countertop, the outer edge of the member 10 catching on the rim or edge of such countertop hole. In the invention this type of dispenser is ingeniously converted at will into a heated drop-in dispenser by the heated tube illustrated in FIGS. 3 and 4.

Referring now particularly to FIGS. 3 and 4, the heated tube comprises a cylinder 20 which is just large enough to have the dispenser of FIGS. 1 and 2 dropped therein, as indicated by the members 12 thereof positioned inside cylinder 20. The cylinder or tube 20 has an upper annular member 21 whose outer flange is slightly larger than the aforementioned countertop hole so that after the tube is passed therethrough it will be suspended therefrom by virtue of the fact that the outer flange of member 21 will catch on the rim or edge of the countertop hole. However, this outer flange of member 21 is slightly smaller than the outer flange of the upper annular member 10 of the dispenser of FIGS. 1 and 2 so that after it is dropped into the tube 20 the member 10 will completely hide or cover the member 21.

Mounted on the inside of the tube 20 is a lengthwise extending and outwardly facing channel 22. Mounted inside this channel 22 are some electric circuit components also to be discussed hereinafter in connection with FIG. 5. Briefly, they comprise a normally contacts closed ambient responsive and adjustable thermostat or switch 23, an indicator light 24, a manual open and close switch 25, the terminal ends of a sheathed heater 26, and the necessary electrical wiring therefor.

The upper end of channel 22 has two locating fingers 22' attached thereto and these two fingers are straddled by a mounting strap 27 extending across the channel so as to provide a mount for the light 24 and switch 25 inside the channel. The light 24 has a visible light lens 24' on the top of strap 27 and the switch 25 has an accessible manual on-off push button 25' on the top of the strap 27.

The flange 10 of the drop-in dispenser has suitable cutouts or notches 22'', 24'' and 25'' for the parts 22', 24' and 25' respectively. When the drop-in dispenser is nested inside the heated tube, the channel 22 of the heated tube is received in one of the U-shaped uprights 12 of the dispenser. In addition, the fingers 22' and notches 22'' properly align the dispenser and tube and assist in guiding the parts 24' and 25' into the cutouts 24'' and 25'' respectively; and also, the fingers also serve as protective guards for parts 24'' and 25''.

Referring to FIG. 5, it will be seen that when the terminals 28 are connected to a source of electricity and the switch 25 closed, the light 24 will go on to indicate that the stack of dishes or the like in the dispenser is being heated by the heater 26. The heater 26 is located at the bottom of the tube and the frame 10, 11, 12 is an open or vented structure so that the load, such as a stack of dishes on the table 16 are heated by natural convection currents passing up into the tube and over its heater 26 and then on up and throughout the dispenser and along and over the stack of dishes. The thermostat 23 is ambient responsive, so will keep the temperature inside the dispenser at that temperature to which it has been adjusted by cycling off and on when the temperature inside the assembly goes above or falls below the selected temperature. The light 24, of course, stays on as long as the dispenser is in the heat on condition.

It will be seen that the invention readily converts an unheated dispenser into a heated one, and adjustments are easy to make. In order to change the heat setting, all that is necessary is to reach into the channel 22 through an adjustment hole 29 formed in the tube 20 to adjust a calibrating member 30 for the switch 23. To adjust the head load or load rate of the dispenser, it is only necessary to remove the dispenser from the tube and adjust the springs 13 and 14 and then drop the dispenser back into the tube. Thus, no disassembly of parts is needed to make either kind of adjustment. Also, since the dispenser and heated tube are separate but complimentary subunits, heated or non-heated dispensers can be provided for the same countertop hole at reduced cost.

I claim:

1. In the combination of a dispenser comprising an annular top member, a circular bottom member, a plurality of lengthwise extending and outwardly facing U-shaped upright and circumferentially spaced members interconnecting the two, and a movable table inside said dispenser, and a heated tube for said dispenser, said tube comprising a cylinder, the improvement of a lengthwise extending and outwardly facing channel member on the inside of said cylinder, an annular-shaped sheathed electric heater solely at the bottom of said cylinder, electric controls for said heater mounted inside said channel member, and said dispenser being removably positioned inside said cylinder with said channel member being positioned inside one of said upright members and said heater being positioned between said cylinder and said circular bottom member.

* * * * *